United States Patent Office 3,475,506
Patented Oct. 28, 1969

---

3,475,506
METHOD OF PRODUCING COMPOUNDS CONTAINING A DOUBLE CARBON-CARBON BOND
Aart Noordermeer, Willem Puister, and Petrus Gerardus Johannes Wesselman, Van Houtenlaan, Netherlands, assignors to U.S. Philips Corporation, New York, N.Y., a corporation of Delaware
No Drawing. Filed May 17, 1967, Ser. No. 639,035
Claims priority, application Netherlands, May 19, 1966, 6606913
Int. Cl. C07c 1/00
U.S. Cl. 260—666
8 Claims

ABSTRACT OF THE DISCLOSURE

Form carbon to carbon double bonds particularly in compounds of the polyene series by a coupling reaction between an adduct of an azomethine of the formula

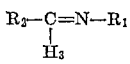

wherein $R_1$ and $R_2$ are hydrogen or organic radicals and an electron acceptor such as $BF_3$, $AlCl_3$, $P_2O_5$ with a phosphorane of the formula

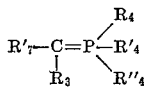

wherein $R'_2$–$R_3$ may be hydrogen or organic radicals and $R_4$, $R_4'$ and $R_4$ organic radicals. Thus the adduct of N-n-butylretinylidene azomethine and $BF_3$ is reacted with axerophthylidene triphenyl phosphonium hydrosulfate in the presence of a base to form β-carotene.

---

The invention relates to a method of producing compounds containing a double carbon-carbon bond.

It is known that compounds containing a double carbon-carbon bond can be produced with the aid of the so-called Wittig reaction by causing a quaternary triaryl- or trialkyl phosphonium salt to react in the presence of a base with an oxo-compound. For example, it has been described in the German patent specification 1,158,505 that β-carotene can be produced by coupling axerophthylidene triphenyl phosphonium hydrosulphate in the presence of a base with vitamin A-aldehyde. The reaction is carried out at a low temperature lying between —50° C. and +100° C. but especially at temperatures of about 0° C.

It is known from "Angew. Chem." 75, 475 (1963) that alkylidene- and aralkylidene triphenyl phosphoranes, such as benzylidene triphenyl phosphorane, can react with N-phenylbenzaldimine and N-phenyl cinnamic aldimine at 130 to 150° C. or at 150 to 180° C. depending upon the presence or the absence in the phosphorane of a methyl group in β-position with respect to the phosphorus atom, whilst forming olefines.

It has been found that phosphoranes having a polyene skeleton such as, for example, axerophthylidene phosphoranes do not react, for example, with N-phenyl benzaldimine, whilst alkylidene and aralkylidene phosphoranes cannot be caused to react either with polyene aldimines. At the temperatures described in the above publication, polyene compounds are destroyed, whilst at lower temperatures at which destruction is avoided, these compounds are no longer reactive.

It was a surprise to find azomethines corresponding with the Formula I

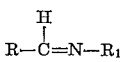

in which formula R represents a polyene residue, can be coupled, whilst forming a double carbon-carbon bond, with a phosphorane if the substance has formed an adduct with an electron acceptor. Under this condition, a phosphorane containing a polyene residue may also be coupled with an imino compound.

As a matter of course, it thus also becomes possible to couple alkylidene and aralkylidene phosphoranes with N-phenyl benzaldimine and other imines which hitherto could be caused to react only at high temperatures.

The invention relates to a method of producing compounds containing a double carbon-carbon bond which is characterized in that an adduct of an electron acceptor β and an azomethine corresponding with the Formula II

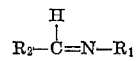

in which formula $R_2$ represents a hydrogen atom, a saturated or non-saturated alkyl-, or cycloalkyl or aralkyl group or an aryl group, which groups may be substituted with a substituent selected from the group consisting of $=NR_1$, —OH, —COOH, $=O$, —CN and functional derivatives thereof, $R_1$ representing a hydrogen atom, an alkyl- or aralkyl group, for example, methyl, ethyl, propyl, isobutyl, pentyl, hexyl, octyl, nonyl, benzyl, phenetyl, phenyl, propyl, naphthylmethyl, butyl, is caused to react with a phosphorane corresponding with the Formula III

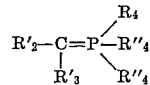

in which formulas $R'_2$ and $R'_3$ have the same meaning as $R_2$, in Formula II, whilst $R'_2$ may be substituted with a

group and $R_4$, $R'_4$ and $R''_4$ represent an alkyl-, an aryl-, an aralkyl or an alkaryl or alkoxyaryl group.

The term "electron acceptor" is to be understood to mean herein a compound which is capable of forming a dative-covalent bond with a substance containing an atom with a free pair of electrons. Such compounds are especially $BF_3$, $SnCl_4$, $FeCl_3$, $AlCl_3$, $P_2O_5$ and $CdCl_2$. Further compounds of this kind are: $AlBr_3$, $ZnCl_2$, $PCl_5$, $GaCl_3$, $BCl_3$, whilst $BBr_3$, $SnBr_4$, $SnJ_4$, $SbCl_5$ and $SbF_5$ may also be mentioned.

Examples of the groups that may be represented by $R_4$, $R'_4$ and $R''_4$ are: ethyl and butyl, p.tolyl, p.anisyl, naphthyl, and especially phenyl, propyl, i.propyl, isobutyl, tert. butyl, methyl, m.pentyl, isopentyl, m.octyl, m.decyl, benzyl, phenetyl, phenylpropyl, p.methylbenzyl, p.methoxy benzyl.

$R_3$ may represent the same groups as specified for $R_1$ and moreover for example cyclohexyl, cyclopentyl, cyclopentenyl, 2,26 - tri-methylcyclohexen-1-yl-1, cyanophenyl, cyanomethyl, carboethoxyethyl, hydroxyphenyl, 2 - ketopropyl.

The method according to the invention is of particular importance for coupling those compounds which hitherto could not be caused to react due to their thermal instability, consequently for coupling phosphoranes corresponding with the Formula III, in which formula $R'_2$ represents a polyene group that may be substituted with

and/or $=N$—$R_1$, and for coupling azomethines corresponding with the Formula II, in which formula $R_2$ represents a polyene group that may be substituted with $=N$—$R_1$.

The method according to the invention is particularly important for the production of vitamin A, of starting materials for the preparation of vitamin A having a polyene chain and of other natural product such as carotinoidal compounds, for example, β-carotene, zeaxanthine, xanthophyl and canthaxanthine, the double carbon-carbon bond thus being formed between the carbon atom bound to the nitrogen atom in Formula II and the carbon atom bound to the phosphorous atom in Formula III.

The coupling reaction in accordance with the invention may be carried out in a manner such that an azomethine of the Formula II is caused to react with an electron acceptor and the adduct obtained is added to a phosphonium salt corresponding with the Formula IV.

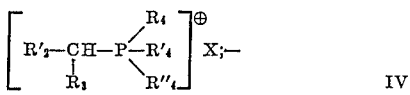

in which formula R′$_2$, R′$_3$, R$_4$, R′$_4$ and R″$_4$ have the same meaning as in Formula III and X⁻ represents an anion such as a chlirine ion, a tosylate ion, a fluoroboronate ion or a hydrosulphate ion, whereupon the phosphorane of the Formula III released from the phosphonium salt under the influence of a base reacts with the azomethine. Suitable bases are the bases known in the literature for converting phosphonium compounds into phosphoranes such as hydroxides, alkalihydroxides, and alcoholates and alkali-amides.

Satisfactory results are obtained if an azomethine is caused to react with a phosphorane obtained in situ from a quaternary phosphonium compound attached, for example, to BF$_3$. Such a quaternary phosphonium compound may be obtained from an alcohol, an esterified alcohol or a complex compound resulting from reduction of an acid, an ester, a ketone or an aldehyde with a metal hydride such as, for example, dibah, by causing one of these compounds to react with a phosphine and an electron acceptor B., hence by reaction of a compound of the Formula V

with a phosphine corresponding with the Formula VI

and an electron acceptor B. In Formula VI, R′$_2$ and R′$_3$ have the same meaning as in Formula IV and R$_5$ represents a hydrogen atom, an acyl group, for example, an acetyl or a palmityl group or the residue A of a metal hydride, which residue is obtained upon reduction of an acid, an ester, a ketone or an aldehyde with such a hydride, for example, in the case of reduction with dibase, the group

Al[CH$_2$CH(CH$_3$)$_2$]$_2$

In Formula VI, R$_4$, R′$_4$ and R″$_4$ have the same meaning as in Formula IV.

The quaternary phosphonium compound obtained may be represented by the Formula VII

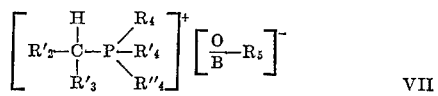

in which formula the symbols have the meaning defined above.

It should be noted that, when a phosphorane of the Formula III is produced in situ from a phosphonium compound with the aid of, for example, potassium hydroxide dissolved in an alcohol, instead of an azomethine of the Formula II, a complex compound formed upon reduction of a nitril with dibase may be added to the reaction mixture. From this complex, first an azomethine of Formula II is formed before it is coupled with the phosphorane.

Such nitril reduction complexes may also be represented by the Formula II in which R$_1$ then represents, the group:

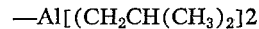
—Al[(CH$_2$CH(CH$_3$)$_2$]$_2$

The method is carried out, whilst air and moisture are excluded. Oxygen may oxidize the phosphorane used to the corresponding aldehyde or ketone and phosphine oxide, whereupon phosphorane that is not yet oxidized can react with this aldehyde or ketone instead of with an azomethine, whilst moisture may cause the phosphorane to decompose under favourable conditions. Therefore, the coupling reaction is preferably carried out in a dry atmosphere of inert gas, for example, argon or nitrogen.

The reaction is preferably carried out in a suitable solvent. Both polar and apolar solvents are suitable, but apolar solvents appear to be preferred. The following solvents may be mentioned: benzene, toluene, halogenated hydrocarbons such as methylene chloride, dichloroethanes, chloroform chlorobenzene, and dimethylsulphoxide, dimethylformamide, ethers, such as tetrahydrofuran.

The temperature of the reaction mixture may vary between comparatively wide limits. When polyene compounds are coupled, the temperature will be kept at a minimum. If more stable compounds are used, the temperature may be chosen slightly higher. In general, the temperature lies between −50 and +100° C. and especially between 0 and +50° C.

Examples of phosphoranes that may be reacted according to the invention are:

4-hydroxy cyclohexylmethylidene tri-n. butyl phosphorane, triphenyl phosphorane, tribenzyl phosphorane, tritotyl phosphorane, trianisyl phosphorane;

3-keto hexylidene tri-n. butyl phosphorane, tri-n. phenyl phosphorane, tri-n. benzyl phosphorane, tri-n. tolyl phosphorane, tri-n. anisyl phosphorane;

2-cyanomethyl pentylidene tri-n. butyl phosphorane, tri-n. phenyl phosphorane, tri-n. benzyl phosphorane, tri-n. tolyl phosphorane, tri-n. anisyl phosphorane;

2-hexylidene tri-n. butyl phosphorane, tri-n. phenyl phosphorane, tri-n. benzyl phosphorane, tri-n. tolyl phosphorane, tri-n. anisyl phosphorane;

1-cyclohexyl-3-keto-hexylidene tri-n. butyl phosphorane, tri-n. phenyl phosphorane, tri-n. benzyl phosphorane, tri-n. tolyl phosphorane, tri-n. anisyl phosphorane;

1 - cyclohexylethylidene tri-n. butyl phosphorane, tri-n. phenyl phosphorane, tri-n. benzyl phosphorane, tri-n. tolyl phosphorane, tri-n. anisyl phosphorane;

1-(4-hydroxycyclohexyl) - 2 - (phenyl) ethylidene tri-n. butyl phosphorane, tri-n. phenyl phosphorane, tri-n. benzyl phosphorane, tri-n. tolyl phosphorane, tri-n. anisyl phosphorane;

1-(m.hydroxyphenyl)-2-(phenyl) ethylidene tri-n. butyl phosphorane, tri-n. phenyl phosphorane, tri-n. benzyl phosphorane, tri-n. tolyl phosphorane, tri-n. anisyl phosphorane;

1 - (p.anisyl) - 2 - (cyano) ethylidene tri-n. butyl phosphorane, tri-n. phenyl phosphorane, tri-n. benzyl phosphorane, tri-n. tolyl phosphorane, tri-n. anisyl phosphorane;

1 - (p.anisyl) ethylidene tri-n. butyl phosphorane, tri-n. phenyl phosphorane, tri-n. benzyl phosphorane, tri-n. tolyl phosphorane, tri-n. anisyl phosphorane.

Examples of azomethines that may be reacted according to the invention are:

Methylidene imine
Cyclohexyl-methylidene imine
2. (3-hydroxycyclohexyl) ethylidene imine
Fenethylidene imine
n. Butylidene imine 3-keto n. butylidene iminie
m. Methoxy fenethylidene imine
4-cyano-buten-2-ylidene imine
N. methyl-cyclohexyl-methylidene azomethine
N. n.propyl cyclohexyl-methylidene azomethine
N. n.isopropyl cyclohexyl-methylidene azomethine
N. n.butylcyclohexyl-methylidene azomethine
N. ethyl-methylidene azomethine
N. n.propyl-methylidene azomethine
N. isopropyl-methylidene azomethine
N. isopropyl-methylidene azomethine
N. benzyl-methylidene azomethine
N. methyl-2. (3-hydroxycyclohexyl) ethylidene azomethine
N. ethyl-2. (3-hydroxycyclohexyl) ethylidene azomethine
N. isopropyl-2. (3-hydroxycyclohexyl) ethylidene azomethine
N. n.butyl-2 (3-hydroxycyoclhexyl) ethylidene azomethine
N. isobutyl-2 (3-hydroxycyclohexyl) ethylidene azomethine
N. benzyl-2. (3-hydroxycyclohexyl) ethylidene azomethine
N. methyl-benzylidene azomethine
N. ethyl-benzylidene azomethine
N. n.propyl-benzylidene azomethine
N. n.butyl-benzylidene azomethine
N. isobutyl benzylidene azomethine
N. methyl phenetylidene
N. n.propyl phenetylidene azomethine
N. isopropyl phenetylidene azomethine
N. isobutyl phenetylidene azomethine
N. benzyl phenetylidene azomethine
N. methyl-n. butylidene azomethine
N. ethyl n. butylidene azomethine
N. propyl-n. butylidene azomethine
N. isopropyl n. butylidene azomethine
N. n. butyl-n. butyidene azomethine
N. isobutyl-n. butylidene azomethine
N. ethyl-3-keto-n.butylidene azomethine
N. n.propyl-3-keto-n. butylidene azomethine
N. isobutyl-3-keto-n. butylidene azomethine
N. benzyl-3-keto-n. butylidene azomethine
N. methyl-buten-2-ylidene azomethine
N. ethyl-buten-2-ylidene azomethine
N. isopropyl-buten-2-ylidene azomethine
N.n. butyl-buten-2-ylidene azomethine
N. isobutyl-buten-2-ylidene azomethine
N. methyl-n. methoxy phenetylidene azomethine
N.n.propyl-n. methoxy phenetylidene azomethine
N.n.butyl-n. methoxy phenetylidene azomethine
N. benzyl-n. methoxy phenetylidene azomethine
N. ethyl-4-cyano-buten-2-ylidene azomethine
N. n.butyl-4-cyano-buten-2-ylidene azomethine

EXAMPLE 1

7.1 gms. (1/40 mol) of crystalline all-trans-Vitamin-A-nitril were dissolved in 100 ml. of dry chlorobenzene. The nitril was reduced at room temperature with 5 ml. (1/40 mol) of di-isobutylaluminiumhydride in 100 ml. of chlorobenzene. After 10 minutes, 2.92 ml. of $SnCl_4.O$ aq (1/40 mol) was added to the reaction mixture. This resulted in a very dark colour and slight development of heat. After stirring for 5 minutes, 15.7 gms. (1/40 mol) of axerophthylidene triphenyl phosphonium hydrosulphate were added. The reaction mixture was then stirred at room temperature for 30 minutes. Subsequently, 10 gms. KOH in 50 ml. of methanol were added, the temperature increasing by 10° C. After 5 minutes, the reaction mixture was acidified with 250 ml. of 1 ON $H_2SO_4$. After stirring for 10 minutes, the layer of water was separated. The organic layer was passed through a water-repelling filter into a graduated flask in which the yield of β-carotene was determined by means of an ultra-violet measurement. The yield was 26.4%.

The test was repeated, but with the difference that no $SnCl_4$ was added. No β-carotene could be found by the ultraviolet measurement at the end of this test.

EXAMPLE 2

At room temperature, 3.5 ml. of $BF_3$-etherate (1/40 mol) was added to a solution of 1/40 mol of N-n. butylretinylidene azomethine in 200 ml. of dry n. butylether. After stirring for 30 minutes, 15.7 gms. of axerophthylidene triphenyl phosphonium hydrosulphate were added.

After this reaction mixture had been stirred for 30 minutes at room temperature, 10 gms. of KOH in 50 ml. of methanol were added. The separation of this reaction mixture was carried out in the same manner as in Example 1. The yield of β-carotene was 45%.

EXAMPLE 3

5.38 gms. (1/40 mol) of crystalline trans-β-ionylidene acetonitril were dissolved in 100 ml. of bromobenzene. The nitril was reduced with 5 ml. (1/40 mol) of di-isobutyl aluminium hydride in 100 ml. of bromobenzene at room temperature. After 10 minutes, 3.55 gms. of $P_2O_5$ (1/40 mol) were added to the reaction mixture. This resulted in slight development of heat and a deeper colour. After stirring for 1 hour at room temperature, 15.7 gms. of axerophthylidene triphenyl phosphonium hydrosulphate were added. After the mixture obtained had been stirred for 30 minutes at room temperature, 10 gms. of KOH in 50 ml. of methanol were added. The separation of the reaction mixture was equal to that in Example 1. The yield of $β_{35}$-carotene, calculated from the UV-spectrum, was 18%.

EXAMPLE 4

3.5 ml. of $BF_3$-etherate (1/40 mol) was added at room temperature to a solution of 1/40 mol of N-n.butyl-$β_{15}$-azomethine in 200 ml. of dry toluene. After stirring for 15 minutes, 15.7 gms. of axerophthylidene triphenyl phosphonium hydrosulphate were added. The reaction mixture was stirred for 30 minutes. Subsequently, 10 gms. of KOH in 50 ml. of methanol were added. The separation was equal to that in Example 1.

The yield of $β_{35}$-carotene, calculated as in Example 3, was 40%.

EXAMPLE 5

Whilst stirring, 2.92 ml. of $SnCl_4O$ aq (1/40 mol) was slowly added at room temperature to a solution of 8.2 gms. (1/40 mol) of crystalline vitamin-A-acetate and 6.55 gms. (1/40 mol) of triphenyl phosphine in 200 ml. of dry benzene. The reaction mixture was stirred for 2 hours at room temperature, which resulted in an oily deposit which was distributed throughout the liquid by stirring. A solution of 1/40 mol of vitamin-A-nitril reduced with diisobutyl aluminium hydride and 2.92 mol of $SnCl_4O$ aq in 200 ml. of dry benzene was added to this heterogeneous solution. The reaction mixture was stirred for 10 minutes and then a solution of 10 gms. of KOH in 50 ml. of methanol was added. The separation was carried out as in Example 1. The yield of β-carotene was 23%.

EXAMPLE 6

Whilst stirring, 3.5 ml. (1/40 mol) of $BF_3$-etherate was slowly added at room temperature to a solution of 7.15 gms. of crystalline all-trans-vitamin-A-alcohol (1/40 mol) and 6.55 gms. of triphenyl phosphine (1/40 mol) in 200 ml. of dry toluene. The mixture was stirred for 2 hours at room temperature. This resulted in a homogeneous yellow-green solution. A solution of 1/40 mol. N-n.butyl-retinylidene azomethine and 3.5 ml. of $BF_3$-etherate (1/40 mol) in 200 ml. of dry toluene was added to this solution. The mixture was stirred for 10 minutes, whereupon a solution of 10 gms. of KOH in 50 ml. of methanol was added. The separation was carried out as in Example 1. The yield of β-carotene was 40%.

EXAMPLE 7

To a solution of 7.15 gms. of crystalline all-trans-vitamin-A-alcohol (1/40 mol) and 6.55 gms. of triphenyl phosphine (1/40 mol) in 200 ml. of dry chlorobenzene was slowly added 3.5 ml. (1/40 mol) of $BF_3$-etherate, whilst stirring at room temperature. The mixture was then re-stirred for 2 hours at room temperature. A solution of 1/40 mol of β-ionylidene acetonitril reduced with di-isobutyl aluminium hydride and 3.5 ml. of $BF_3$-etherate was added to the solution obtained. The reaction mixture was stirred for 10 minutes, whereupon a solution of 10 gms. of KOH in 50 ml. of methanol was added. The separation was carried out as in Example 1. The yield of $\beta_{35}$-carotene was 22%.

EXAMPLE 8

The test of Example 7 was repeated with the only difference that no $BF_3$ was added to the reduced nitril. Yield: 22%.

EXAMPLE 9

Whilst stirring at room temperature, 3.5 ml. of $BF_3$-etherate was slowly added to a solution of 8.2 gms. (1/40 mol) of crystalline all-trans-vitamin-A-acetate and 6.55 gms. (1/40 mol) of triphenyl phosphine in 200 ml. of dry dichloro-ethane. To this solution was added a solution of 1/40 mol of N-n.butyl-$\beta_{15}$-azomethine and 3.5 ml. of $BF_3$-etherate in 200 ml. of dry dichloro-ethane. After stirring for 15 minutes at room temperature, a solution of 10 gms. of KOH in 50 ml. of methanol was added. The separation was carried out as in Example 1. The yield of $\beta_{35}$-carotene was 50%.

EXAMPLE 10

Whilst stirring at room temperature, 2.92 ml. of $SnCl_4Oaq$ was slowly added to a solution of 5.5 gms. of β-ionylidene ethanol (1/40 mol) and 6.55 gms. of triphenyl phosphine (1/40 mol) in 200 ml. of dry benzene. The mixture was re-stirred for 2 hours at room temperature. A heterogeneous solution was obtained to which was added a solution of 1/40 mol of vitamin-A-nitril reduced with di-isobutyl aluminium hydride in 200 ml. of dry benzene and 2.92 ml. of $SnCl_4Oaq$. The reaction mixture was stirred for 30 minutes at room temperature, whereupon 10 gms. of KOH in 50 ml. of methanol were added. The reaction product was separated in the manner described in Example 1. Yield of $\beta_{35}$-carotene was 23%.

EXAMPLE 11

Whilst stirring at room temperature, 5.84 ml. of $SnCl_4Oaq$ was added to a solution of 10.75 gms. of β-ionylidene acetonitril in 200 ml. of dry benzene and 10 ml. of di-isobutyl aluminium hydride and the resultant mixture was re-stirred for 10 minutes. Subsequently, 18.45 gms. of butene-1,4-diphosphonium bromide (1/40 mol) were added and the mixture was then stirred for 1 hour at room temperature. This resulted in an orange-yellow turbid solution. To this solution were added 10 gms. of KOH in 50 ml. of methanol. The separation was carried out as in Example 1. The yield of $\beta_{34}$-carotene was 10.8%.

What is claimed is:

1. A method of producing a β-carotene comprising reacting an adduct of an electron acceptor and an azomethine corresponding to the Formula I:

$$R_2=N-R_1$$

wherein $R_1$ is a member selected from the group consisting of hydrogen, alkyl and aralkyl and $R_2$ is selected from the group consisting of retinylidene and β-ionylidene-ethylidene and a phosphorane of the Formula III:

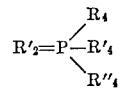

wherein $R'_2$ has the same meanings as $R_2$ and $R_4$, $R'_4$ and $R''_4$ are selected from the group consisting of alkyl, aryl, alkaryl, aralkyl and alkoxyaryl.

2. The method of claim 1 wherein the phosphorane is produced in situ from a quaternary phosphonium compound of the formula

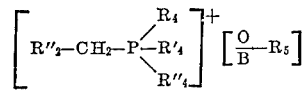

wherein $R_4$, $R'_4$ and $R''_4$ have the same meanings as in claim 1, $R''_2$—$CH_2$ is a moiety selected from the group consisting of β-ionylidene-ethyl and retinyl ethyl, β is an electron acceptor and $R_5$ is selected from the group consisting of hydrogen, acyl and the residue of a metal hydride formed during the reaction of the metal hydride on an acid, ester, ketone or aldehyde.

3. A method as claimed in claim 1, characterized in that the electron acceptor B used is chosen from a group consisting of: $BF_3$, $SnCl_4$, $FeCl_3$, $AlCl_3$, $P_2O_5$, $CdCl_2$, $AlBr_3$, $ZnCl_2$, $PCl_5$, $GaCl_3$, $BBr_3$, $SnBr_4$, $SnI_4$, $SbCl_5$ and $SbF_5$.

4. A method as claimed in claim 3, characterized in that the electron acceptor used is chosen from the group consisting of $BF_3$, $SnCl_4$, and $AlCl_3$.

5. A method as claimed in claim 4, characterized in that the electron acceptor used consists of $BF_3$ or $SnCl_4$.

6. A method as claimed in claim 1, characterized in that a compound of the Formula III is caused to react in which formula $R_4$, $R'_4$ and $R''_4$ represent a phenyl group.

7. A method as claimed in claim 1, characterized in that an N-alkylazomethine of the Formula I is caused to react.

8. A method as claimed in claim 1, characterized in that an N-n.butylazomethine of the Formula I is caused to react.

References Cited

UNITED STATES PATENTS

| | | | |
|---|---|---|---|
| 2,819,312 | 1/1958 | Isler et al. | 260—598 |
| 2,849,507 | 8/1958 | Isler et al. | |
| 2,891,986 | 6/1959 | Grassetti. | |
| 2,917,523 | 12/1959 | Pommer | 260—410.9 |
| 3,247,239 | 4/1966 | Truscheit et al. | 260—468 |
| 3,356,753 | 12/1967 | Sarnecki. | |
| 3,429,928 | 2/1969 | Surmatis | 260—586 |
| 2,945,069 | 7/1960 | Stern | 260—606.5 |

DELBERT E. GANTZ, Primary Examiner

V. O'KEEFE, Assistant Examiner